(12) United States Patent
Zeng et al.

(10) Patent No.: US 8,368,847 B2
(45) Date of Patent: Feb. 5, 2013

(54) TRIPLE-GATE LCD PANEL

(75) Inventors: Guang-Yi Zeng, Changhua County (TW); Chih-Hsiang Hsu, Tainan (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 250 days.

(21) Appl. No.: 13/008,348

(22) Filed: Jan. 18, 2011

(65) Prior Publication Data

US 2012/0075543 A1 Mar. 29, 2012

(30) Foreign Application Priority Data

Sep. 29, 2010 (TW) ................................ 99218776 U (51) Int. Cl.
 G02F 1/136 (2006.01)
 G02F 1/1335 (2006.01)
 G02F 1/1343 (2006.01)
 G09G 3/36 (2006.01)
(52) U.S. Cl. .............................. 349/92; 349/109; 345/98
(58) Field of Classification Search .................. 349/106, 349/109, 139, 145, 92; 345/98
See application file for complete search history.

(56) References Cited

U.S. PATENT DOCUMENTS

| 5,898,208 | A * | 4/1999 | Miyazaki et al. | 349/106 |
| 6,667,777 | B2 * | 12/2003 | Kikkawa et al. | 349/38 |
| 7,075,601 | B2 * | 7/2006 | Hong et al. | 349/109 |
| 2004/0239837 | A1 | 12/2004 | Hong et al. | |
| 2012/0120359 | A1 * | 5/2012 | Hsu et al. | 349/139 |

FOREIGN PATENT DOCUMENTS

TW 200627355 8/2006

* cited by examiner

Primary Examiner — Akm Enayet Ullah
(74) Attorney, Agent, or Firm — WPAT PC; Justin King (57) ABSTRACT

A triple-gate LCD panel includes a transistor array substrate, a color filter array substrate, and a liquid crystal layer disposed between the transistor array substrate and the color filter array substrate. A transistor array of the transistor array substrate includes a plurality of scan lines, data lines, and pixel switches connected to the scan lines and the data lines. The pixel switches in any column are connected to two adjacent data lines respectively. Two adjacent pixel switches in any column are connected to the same data line. The pixel switches, the liquid crystal layer, and the color filter array substrate define a plurality of monochromatic pixel units. The monochromatic pixel units in any row are all a plurality of red pixel units, green pixel units, or blue pixel units. The red pixel units, the green pixel units, and the blue pixel units in any column are arranged periodically.

10 Claims, 5 Drawing Sheets

TRIPLE-GATE LCD PANEL

CROSS-REFERENCE TO RELATED APPLICATION

This application claims the benefit of Taiwan Patent Application No. 099218776, filed on Sep. 29, 2010, which is hereby incorporated by reference for all purposes as if fully set forth herein.

BACKGROUND OF THE INVENTION

1. Field of Invention

The present invention relates to a display panel, and in particular, to a liquid crystal display (LCD) panel.

2. Related Art

An LCD is a mainstream product in the current display market, and the main components in the LCD include a triple-gate LCD panel. Generally speaking, after triple-gate LCD panels are completed, a series of testing procedures are performed to separate normal LCD panels from abnormal LCD panels, so that the normal LCD panels can proceed to the following manufacturing processes, and the abnormal LCD panels are reworked or scraped.

SUMMARY OF THE INVENTION

The present invention is directed to a triple-gate LCD panel applied to an LCD.

The present invention provides a triple-gate LCD panel comprising a transistor array substrate, a color filter array substrate, and a liquid crystal layer. The liquid crystal layer is disposed between the transistor array substrate and the color filter array substrate. The transistor array substrate comprises a substrate and a transistor array disposed on the substrate. The transistor array comprises a plurality of scan lines, a plurality of data lines, and a plurality of pixel switches. The pixel switches are arranged along the scan lines and the data lines in an array and connected to the scan lines and the data lines. The pixel switches in any column are connected to two adjacent data lines respectively, and two adjacent pixel switches in any column are connected to the same data line. The pixel switches, the liquid crystal layer, and the color filter array substrate define a plurality of monochromatic pixel units. The monochromatic pixel units in any row comprise a plurality of red pixel units, a plurality of green pixel units, or a plurality of blue pixel units. The red pixel units, the green pixel units, and the blue pixel units in any column are arranged periodically.

The triple-gate LCD panel provided by the present invention comprises the transistor array substrate, the color filter array substrate, and the liquid crystal layer, and a plurality of pixel switches in the transistor array substrate, the liquid crystal layer, and the color filter array substrate define a plurality of monochromatic pixel units, so that it enables the triple-gate LCD panel to be applied to the LCD.

In order to make the characteristics and effects of the present invention more obvious and comprehensible, the present invention is described in further detail below with reference to embodiments and the accompanying drawings.

BRIEF DESCRIPTION OF THE DRAWINGS

The present invention will become more fully understood from the detailed description given herein below for illustration only, and thus are not limitative to the present invention, and wherein.

DETAILED DESCRIPTION OF THE INVENTION

Figure 1A:
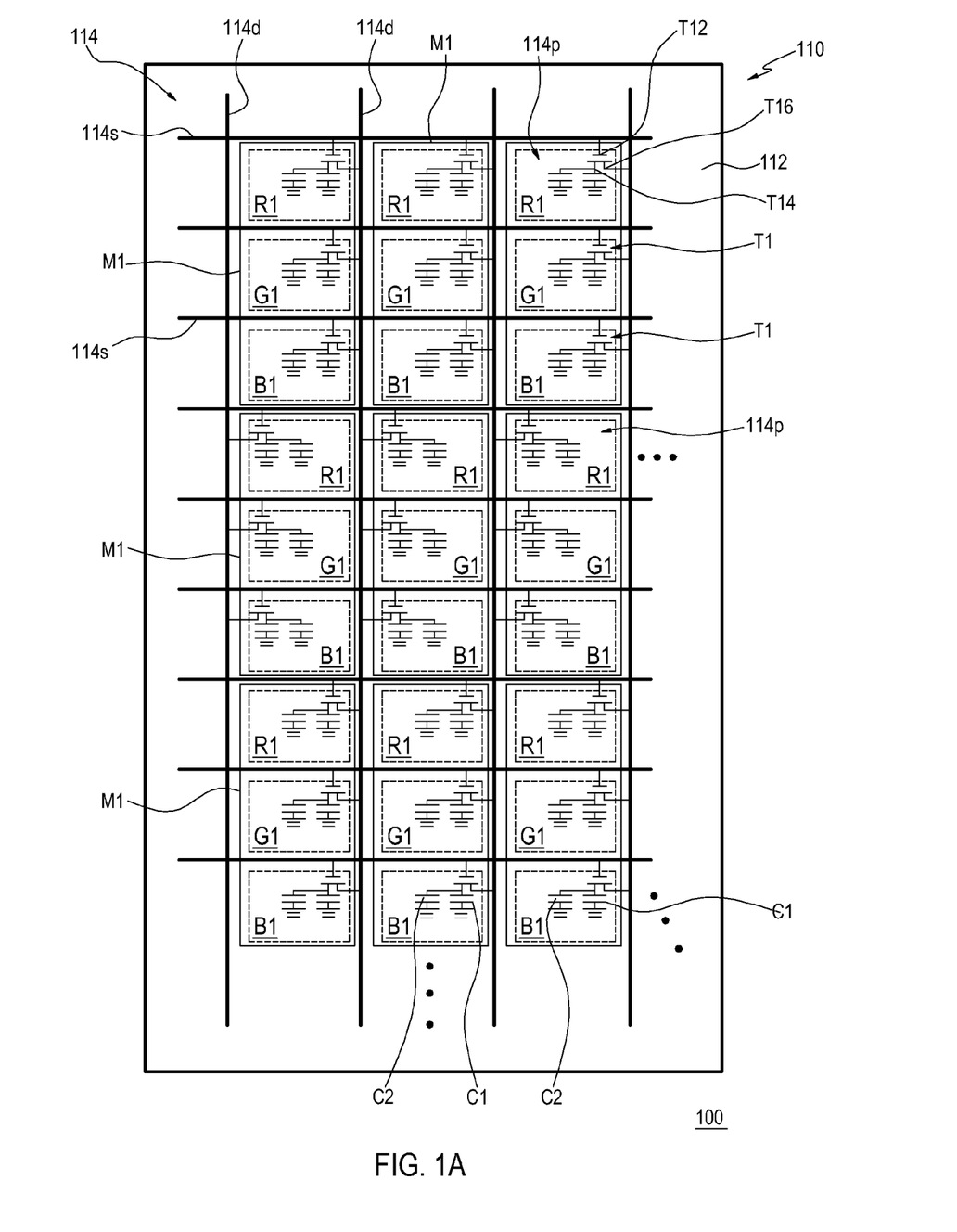
FIG. 1A is a schematic circuit diagram of a triple-gate LCD panel according to an embodiment of the present invention.

FIG. 1A is a schematic circuit diagram of a triple-gate LCD panel according to an embodiment of the present invention. Referring to FIG. 1A, the triple-gate LCD panel 100 in this embodiment includes a transistor array substrate 110. The transistor array substrate 110 includes a substrate 112 and a transistor array 114. The transistor array 114 is disposed on the substrate 112, and includes a plurality of scan lines 114s, a plurality of data lines 114d, and a plurality of pixel switches 114p.

The pixel switches 114p are connected to the scan lines 114s and the data lines 114d, and are arranged along the scan lines 114s and the data lines 114d in an array. That is to say, the pixel switches 114p may be arranged in a plurality of columns and rows. Taking FIG. 1A for example, the scan lines 114s in columns are arranged side by side, and the data lines 114d in rows are arranged side by side. The scan lines 114s cross the data lines 114d, so that the scan lines 114s and the data lines 114d are arranged in a net. The pixel switches 114p are located in a plurality of lattices formed by the scan lines 114s and the data lines 114d respectively, as shown in FIG. 1A.

In the embodiment as shown in FIG. 1A, any column of the pixel switches 114p are located between two adjacent data lines 114d and connected to the two adjacent data lines 114d respectively. Moreover, two adjacent pixel switches 114p in any column are connected to the same data line 114d. For example, as shown in FIG. 1A, in any column, three adjacent pixel switches 114p are connected to the same data line 114d, and another three adjacent pixel switches 114p are connected to another data line 114d.

Figure 1B:
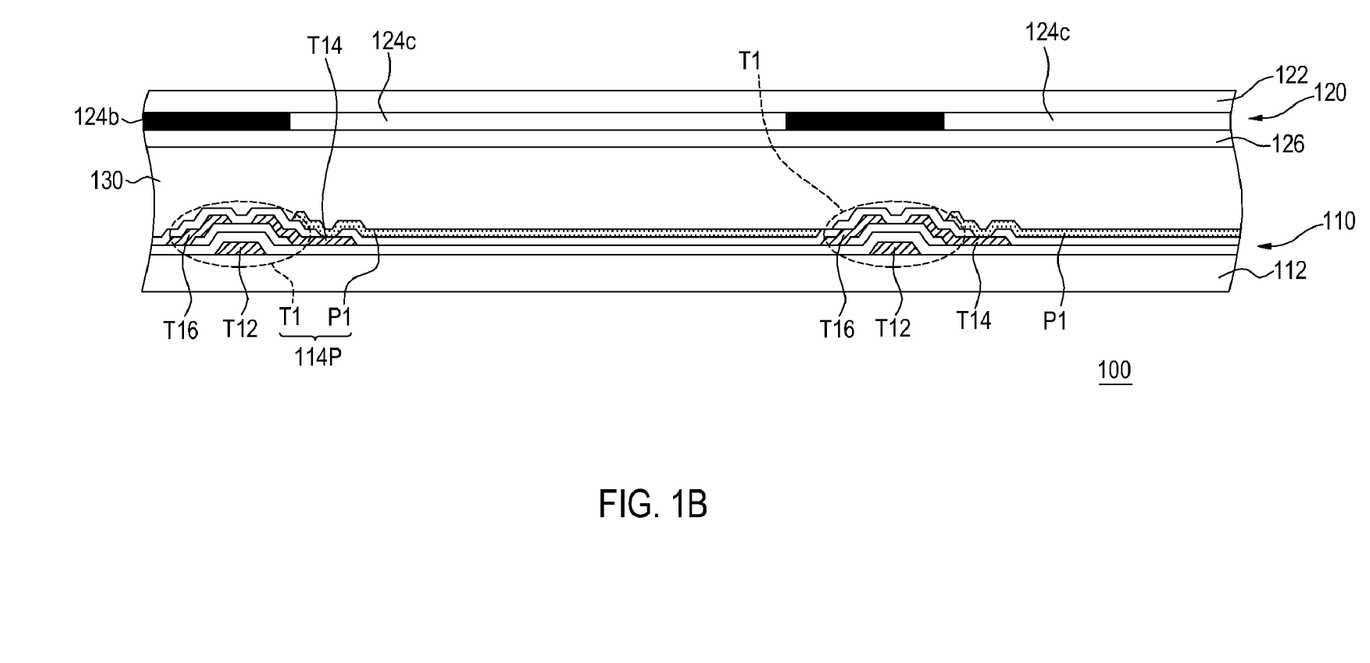
FIG. 1B is a schematic cross-sectional view of the triple-gate LCD panel in FIG. 1A.

FIG. 1B is a schematic cross-sectional view of the triple-gate LCD panel in FIG. 1A. Referring to FIG. 1A and FIG. 1B, the triple-gate LCD panel 100 further includes a color filter array substrate 120 and a liquid crystal layer 130, and has a plurality of monochromatic pixel units R1, G1, and B1. The liquid crystal layer 130 is disposed between the transistor array substrate 110 and the color filter array substrate 120, as shown in FIG. 1B. The pixel switches 114p, the liquid crystal layer 130, and the color filter array substrate 120 define the monochromatic pixel units R1, G1, and B1.

Specifically, each of the pixel switches 114p includes a transistor T1 and a pixel electrode P1, and the transistors T1 are connected to the pixel electrodes P1, the scan lines 114s, and the data lines 114d. The transistor T1 may be a field-effect transistor (FET) and have a gate T12, a drain T14, and a source T16. In each of the transistors T1, the gate T12 is connected to the scan line 114s, the source T16 is connected to the data line 114d, and the drain T14 is connected to the pixel electrode P1.

The color filter array substrate 120 includes a transparent substrate 122, a plurality of filters 124c arranged in an array, and a common electrode 126. The filters 124c are disposed between the transparent substrate 122 and the common electrode 126, and are opposite to the pixel electrodes P1 respectively. Specifically, the filters 124c are located just above the pixel electrodes P1 respectively and overlap these pixel electrodes P1. Additionally, the filters 124c are, for example, a plurality of red filters, a plurality of green filters, and a plurality of blue filters.

Furthermore, the color filter array substrate 120 may further include a black matrix 124b. The black matrix 124b is disposed between the transparent substrate 122 and the common electrode 126 and can cover the transistors T1, so that the transistors T1 do not affect the image quality of the triple-gate LCD panel 100. Additionally, the black matrix 124b may be in the shape of a net, and the filters 124c are disposed in a plurality of lattices of the black matrix 124b respectively.

The liquid crystal layer 130 is disposed between the transistor array substrate 110 and the color filter array substrate 120 and is sandwiched between the common electrode 126 and the pixel electrodes P1, so that the common electrode 126, the liquid crystal layer 130, and the pixel electrodes P1 may form a plurality of liquid crystal capacitors C1. The liquid crystal capacitors C1, the transistors T1, and the filters 124c may form the monochromatic pixel units R1, G1, and B1, as shown in FIG. 1A.

Each of the pixel switches 114p may further include a storage capacitor C2, and the storage capacitor C2 is electrically connected to the liquid crystal capacitor C1 and the transistor T1. In the same pixel switch 114p, the storage capacitor C2 and the liquid crystal capacitor C1 are in parallel connection. Moreover, the structure of the storage capacitor C2 may be metal/insulator/Indium Tin Oxide (ITO) (MII) or metal/insulator/metal (MIM), and the storage capacitor C2 may be a storage capacitor on the scan line 114s (Cst on gate) or a storage capacitor on a common line (It is called "Cst on common", and the common line is not shown in the figure).

The monochromatic pixel units R1, G1, and B1 may be a plurality of red pixel units, a plurality of green pixel units, and a plurality of blue pixel units. The monochromatic pixel units R1 may be the red pixel units, the monochromatic pixel units G1 may be the green pixel units, and the monochromatic pixel units B1 may be the blue pixel units. Moreover, the filter 124c of the monochromatic pixel unit R1 may be a red filter, the filter 124c of the monochromatic pixel unit G1 may be a green filter, and the filter 124c of the monochromatic pixel unit B1 may be a blue filter.

Referring to FIG. 1A again, the pixel switches 114p are arranged in an array, and the monochromatic pixel units R1, G1, and B1 are defined by the pixel switches 114p, the liquid crystal layer 130, and the color filter array substrate 120, so that the monochromatic pixel units R1, G1, and B1 may also be arranged along the scan lines 114s and the data lines 114d in an array and located in the lattices formed by the scan lines 114s and the data lines 114d respectively. Therefore, the monochromatic pixel units R1, G1, and B1 may also be arranged in a plurality of columns and rows.

In each row of the monochromatic pixel units R1, G1, and B1, the monochromatic pixel units in the same color (that is, the monochromatic pixel units R1, G1, or B1) may be arranged in one row. Therefore, the monochromatic pixel units in any row are a plurality of monochromatic pixel units R1 (for example, the red pixel units), a plurality of monochromatic pixel units G1 (for example, the green pixel units), or a plurality of monochromatic pixel units B1 (for example, the blue pixel units).

In each column of the monochromatic pixel units R1, G1, and B1, the monochromatic pixel units R1, G1, and B1 in different colors are disposed in one column, but any two monochromatic pixel units in the same color are not adjacent to each other. That is to say, the monochromatic pixel units R1 in any column are not adjacent to each other, the monochromatic pixel units G1 in any column are not adjacent to each other, and the monochromatic pixel units B1 in any column are not adjacent to each other.

The red pixel units, the green pixel units, and the blue pixel units in any column are arranged periodically. In any column of the monochromatic pixel units R1, G1, and B1, one of the monochromatic pixel units R1, one of the monochromatic pixel units G1, and one of the monochromatic pixel units B1 are adjacent to each other and form a main pixel unit M1. Since the monochromatic pixel units R1, G1, and B1 are arranged along the scan lines 114s and the data lines 114d in an array, the main pixel units M1 may also be arranged along the scan lines 114s and the data lines 114d in an array, as shown in FIG. 1A.

Arrangement orders of the monochromatic pixel units R1, G1, and B1 in every main pixel units M1 are the same. Taking FIG. 1A for example, in any one of the main pixel units M1, the monochromatic pixel units R1, G1, and B1 are arranged along one of the data lines 114d, and the monochromatic pixel units R1, G1, and B1 are arranged in an order of the monochromatic pixel unit R1, the monochromatic pixel unit G1, and the monochromatic pixel unit B1. That is to say, in each of the main pixel units M1, the monochromatic pixel units R1, G1, and B1 are arranged along the data line 114d in the order of the red pixel unit, the green pixel unit, and the blue pixel unit.

In each column of the monochromatic pixel units R1, G1, and B1, any two monochromatic pixel units in the same color are not adjacent to each other, and the arrangement orders of the monochromatic pixel units R1, G1, and B1 in every main pixel units M1 are the same, so that any column of the red pixel units (for example, the monochromatic pixel units R1), the green pixel units (for example, the monochromatic pixel units G1), and the blue pixel units (for example, the monochromatic pixel units B1) are arranged periodically.

It should be noted that although the monochromatic pixel units R1, G1, and B1 in each of the main pixel units M1 as shown in FIG. 1A are arranged in the order of the red pixel unit, the green pixel unit, and the blue pixel unit, in another embodiment, the monochromatic pixel units R1, G1, and B1 in each of the main pixel units M1 may be arranged in other order, such as in an order of the green pixel unit, the blue pixel unit, and the red pixel unit. Therefore, the arrangement order of the monochromatic pixel units R1, G1, and B1 in the main pixel unit M1 as shown in FIG. 1A is for illustration only and may not limit the present invention.

Additionally, the monochromatic pixel units R1, G1, and B1 in the same main pixel units M1 are electrically connected to the same data line 114d. Among the main pixel units M1 in the same column, some of the main pixel units M1 are electrically connected to one data line 114d, and the other main pixel units M1 are electrically connected to another data line 114d. For example, in any two adjacent main pixel units M1 in the same column, one of the main pixel units M1 is electrically connected to one of the data lines 114d, and the other main pixel unit M1 is electrically connected to another data line 114d, as shown in FIG. 1A.

The existing triple-gate LCD panel testing procedure includes a plurality of electrical tests. In some of the electrical tests, a triple-gate LCD panel may display an ichimatsu pattern, and a testing machine is used for detecting whether the triple-gate LCD panel works normally. A triple-gate LCD panel 100 completed may also display the ichimatsu pattern, so as to perform electrically tests.

Figure 1C:
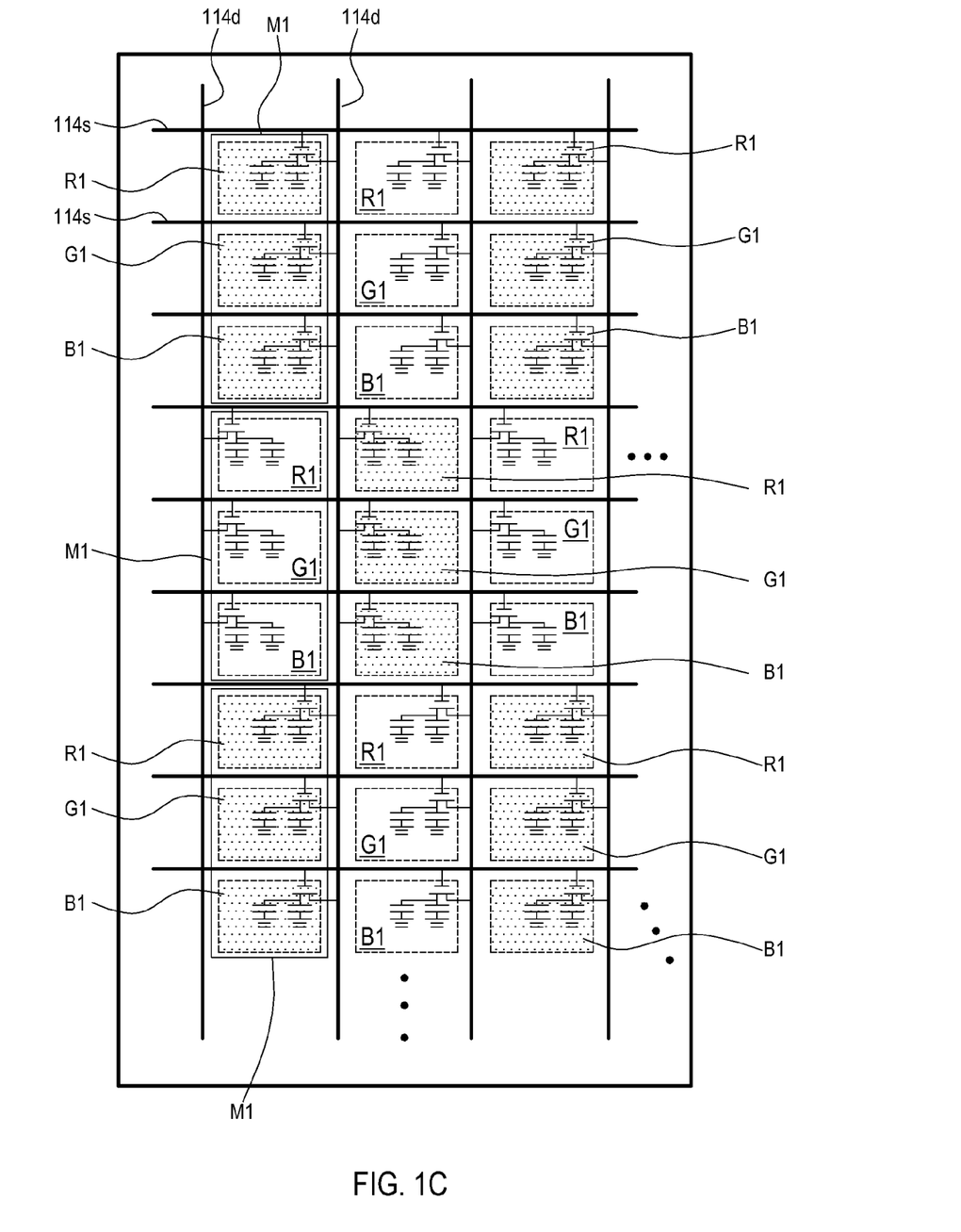
FIG. 1C is a schematic view of the triple-gate LCD panel in FIG. 1A when showing an ichimatsu pattern.

FIG. 1C is a schematic view of the triple-gate LCD panel in FIG. 1A when showing an ichimatsu pattern. Referring to FIG. 1C, when the triple-gate LCD panel 100 displays the ichimatsu pattern, the monochromatic pixel units R1, G1, and B1 in some of the main pixel units M1 display the same color in middle gray scale, and the monochromatic pixel units R1, G1, and B1 in the rest of the main pixel units M1 display the same color in low gray scale, such as black.

In view of the above, taking 8-bit: 256 gray scale values as an example, when the triple-gate LCD panel 100 displays the ichimatsu pattern, the gray scale value of the color in middle gray scale displayed by some monochromatic pixel units R1, G1, and B1 is, for example, 128; and all of the gray scale values of the colors in low gray scale displayed by the rest of the monochromatic pixel units R1, G1, and B1 are 0.

In order to clearly show the gray scale colors displayed by the monochromatic pixel units R1, G1, and B1 when displaying the ichimatsu pattern, some monochromatic pixel units R1, G1, and B1 in FIG. 1C are filled with dots. The monochromatic pixel units R1, G1, and B1 filled with the dots represent that the monochromatic pixel units R1, G1, and B1 display the color in low gray scale, and the monochromatic pixel units R1, G1, and B1 without filled with the dots represent that the monochromatic pixel units R1, G1, and B1 display the color in middle gray scale.

According to FIG. 1C, when the triple-gate LCD panel 100 displays the ichimatsu pattern, the main pixel units M1 in any column display the color in middle gray scale and the color in low gray scale alternately, and the monochromatic pixel units R1, G1, and B1 in any row also display the color in middle gray scale and the color in low gray scale alternately. No matter arranged in rows or columns, the main pixel units M1 displaying the color in low gray scale are not adjacent to the main pixel units M1 displaying the color in middle gray scale. Therefore, all of the main pixel units M1 display the colors in low gray scale and middle gray scale in an arrangement of the pattern like a chess board.

When the ichimatsu pattern is displayed, taking FIG. 1C as an example, the scan lines 114s input an electric signal to the monochromatic pixel units R1, G1, and B1 in an order from top to bottom, so that a pixel voltage output by the data lines 114d can charge the monochromatic pixel units R1, G1, and B1 to enable the monochromatic pixel units R1, G1, and B1 arranged in each row to display the colors in low gray scale and middle gray scale alternately from top to bottom.

Accordingly, when one of the scan lines 114s inputs an electric signal to one row of the monochromatic pixel units R1, G1, or B1 electrically connected to the scan line 114s, a next scan line 114s will also input an electric signal to another row of the monochromatic pixel units R1, G1, or B1 electrically connected to the next scan line 114s, thereby to pre-charging the monochromatic pixel units R1, G1, or B1 in the next row.

The monochromatic pixel units R1, G1, and B1 in the same main pixel unit M1 are electrically connected to the same data line 114d, and all of the main pixel units M1 display the color in low gray scale and middle gray scale in the arrangement of the pattern of like a chess board, so that one monochromatic pixel unit R1, G1, or B1 displaying the color in low gray scale may pre-charge another monochromatic pixel unit R1, G1, or B1 displaying the color in low gray scale, and one monochromatic pixel unit R1, G1, or B1 displaying the color in middle gray scale may pre-charge another monochromatic pixel unit R1, G1, or B1 displaying the color in middle gray scale when the ichimatsu pattern is displayed.

Taking FIG. 1C as an example for illustration, during the ichimatsu pattern displayed, when the leftmost data line 114d charges the top monochromatic pixel unit R1, the monochromatic pixel unit G1 in the next row is pre-charged. The monochromatic pixel unit R1 charged and the monochromatic pixel unit G1 pre-charged both display the same color in low gray scale.

Accordingly, when the leftmost data line 114d charges the monochromatic pixel unit B1 located in the third row counted from the top, the monochromatic pixel unit R1 located in the neighboring column and in the next row (the fourth row counted from the top) may be pre-charged. The monochromatic pixel unit B1 charged and the monochromatic pixel unit R1 pre-charged both display the same color in low gray scale.

In view of the above, when the ichimatsu pattern is displayed, only the monochromatic pixel unit R1, G1, or B1 displaying the color in low gray scale will pre-charge another monochromatic pixel unit R1, G1, or B1 also displaying the color in low gray scale, and the monochromatic pixel unit R1, G1, or B1 displaying the color in middle gray scale will pre-charge another monochromatic pixel unit R1, G1, or B1 also displaying the color in middle gray scale.

Therefore, the voltages received by the monochromatic pixel units R1, G1, and B1 being charged or pre-charged are substantially the same, so that the monochromatic pixel units R1, G1, and B1 displaying the color in middle gray scale are under the same gray scale brightness, and the monochromatic pixel units R1, G1, and B1 displaying the color in low gray scale are also under the same gray scale brightness. Thus, the triple-gate LCD panel 100 can decrease the probability of color distortion in the ichimatsu pattern and prompt the color of the ichimatsu pattern closer to white or substantially white. Thus, it is not easy for the color of the ichimatsu pattern to be close to a color such as red, green, or blue except white.

Figure 2A:
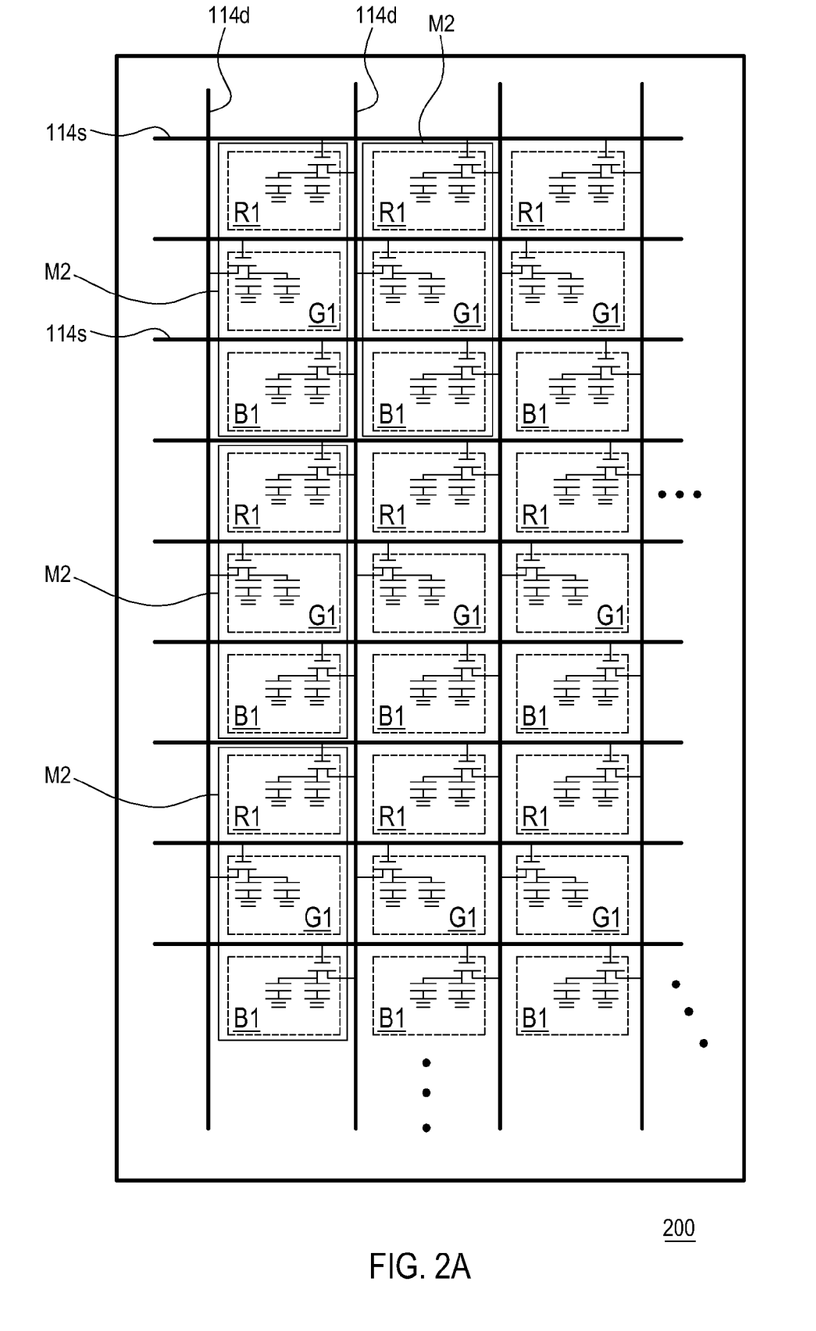
FIG. 2A is a schematic circuit diagram of a triple-gate LCD panel according to another embodiment of the present invention.
Figure 2B:
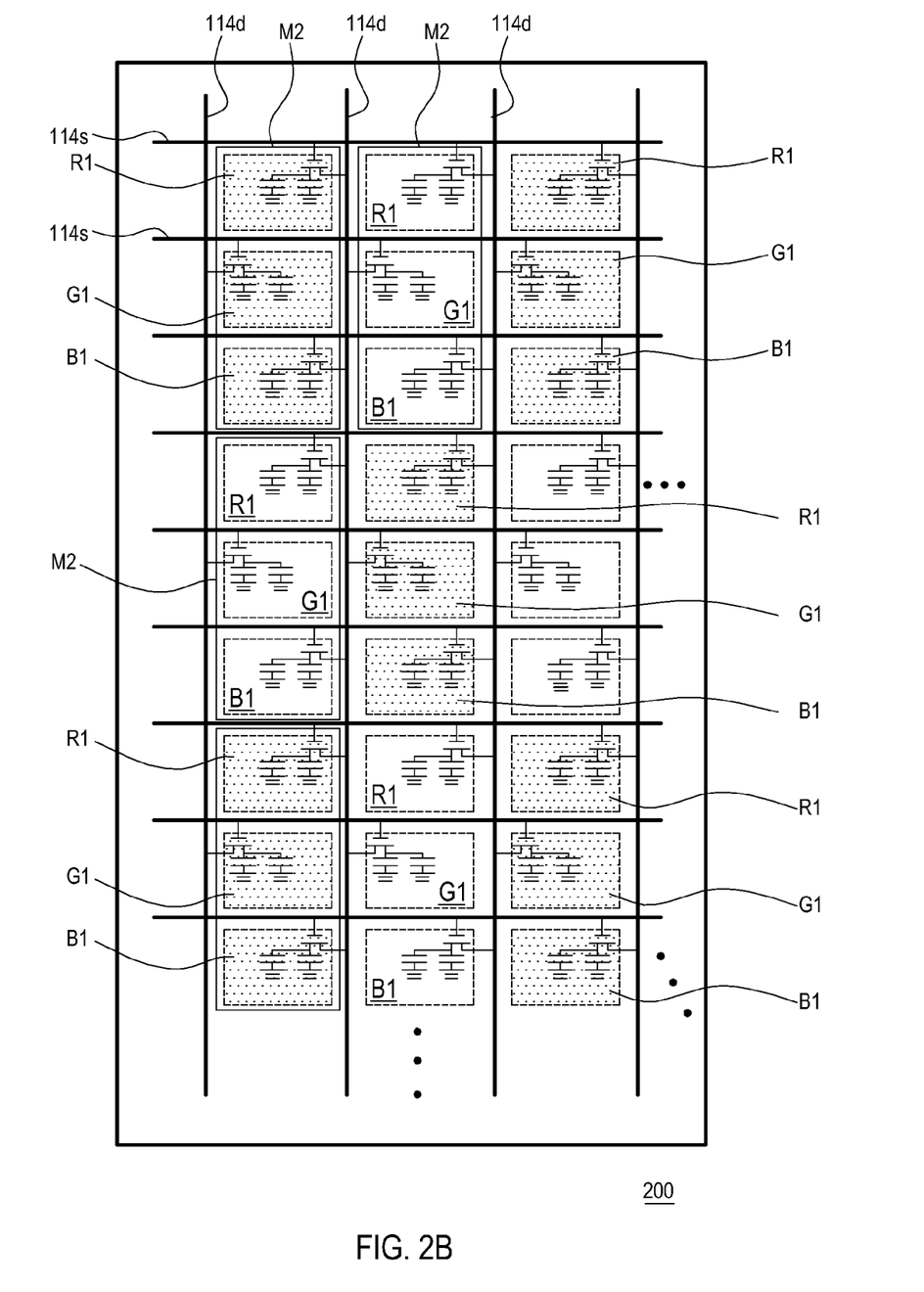
FIG. 2B is a schematic view of the triple-gate LCD panel in FIG. 2A when showing an ichimatsu pattern.

FIG. 2A is a schematic circuit diagram of a triple-gate LCD panel according to another embodiment of the present invention. Referring to FIG. 2A, the triple-gate LCD panel 200 in this embodiment is similar to the above triple-gate LCD panel 100. For example, the components included in the two triple-gate LCD panels and the sectional structures thereof (as shown in FIG. 2B) are the same. Therefore, to make the specification concise, the difference between the triple-gate LCD panels 100 and 200 is mainly described below in principle, and the same characteristics of the two triple-gate LCD panels will not be discussed or illustrated herein again.

The difference between the triple-gate LCD panels 200 and 100 lies in the electrical connection manner of the monochromatic pixel units R1, G1, and B1 to the data line 114d. Specifically, in the triple-gate LCD panel 200, all of the monochromatic pixel units R1, G1, and B1 are electrically connected to the data lines 114d, and three adjacent monochromatic pixel units R1, G1, and B1 form a main pixel unit M2 in any column of the monochromatic pixel units R1, G1, and B1, but the monochromatic pixel units R1, G1, and B1 in the main pixel units M2 are electrically connected to the data lines 114d in a manner different from that in the above triple-gate LCD panel 100.

Accordingly, in the same main pixel unit M2, the monochromatic pixel units R1 and B1 are both electrically connected to one data line 114d, while the monochromatic pixel unit G1 is electrically connected to another data line 114d. Moreover, the monochromatic pixel units R1 and B1 electrically connected to the same data line 114d are not adjacent to each other, and each of the monochromatic pixel units G1 is located between the monochromatic pixel units R1 and B1, as shown in FIG. 2A.

The monochromatic pixel unit R1 may be a red pixel unit, the monochromatic pixel unit G1 may be a green pixel unit, and the monochromatic pixel unit B1 may be a blue pixel unit.

Among the monochromatic pixel units R1, G1, and B1 in the same column, the red pixel units (for example, the monochromatic pixel units R1) and the blue pixel units (for example, the monochromatic pixel units B1) are electrically connected to the same data line 114d, while the green pixel units (for example, the monochromatic pixel units G1) are electrically connected to another data line 114d.

FIG. 2B is a schematic view of the triple-gate LCD panel in FIG. 2A when showing an ichimatsu pattern. Referring to FIG. 2B, similar to FIG. 1C, in order to clearly show the gray scale colors displayed by the monochromatic pixel units R1, G1, and B1 when displaying the ichimatsu pattern, in FIG. 2B, the monochromatic pixel units R1, G1, and B1 filled with dots represent that the monochromatic pixel units R1, G1, and B1 display the color in low gray scale, and the monochromatic pixel units R1, G1, and B1 without filled with the dots represent that the monochromatic pixel units R1, G1, and B1 display the color in middle gray scale.

When the ichimatsu pattern is displayed, the scan lines 114s input an electric signal to the monochromatic pixel units R1, G1, and B1 in an order from top to bottom, so that the data lines 114d can charge the monochromatic pixel units R1, G1, and B1 to enable the monochromatic pixel units R1, G1, and B1 arranged in each row to display the color in low gray scale and middle gray scale alternately from top to bottom.

In view of the above, during that one scan line 114s is inputting an electric signal to one row of the monochromatic pixel units R1, G1, or B1 electrically connected to the scan line 114s, a next scan line 114s inputs an electric signal to another row of the monochromatic pixel units R1, G1, or B1 electrically connected to the next scan line 114s, thereby pre-charging the monochromatic pixel units R1, G1, or B1 in the next row.

In the same pixel unit M2, the monochromatic pixel unit G1 is electrically connected to a data line 114d, and the monochromatic pixel units R1 and B1 not adjacent to each other are electrically connected to another data line 114d, so that one monochromatic pixel unit R1, G1, or B1 displaying the color in low gray scale pre-charges another monochromatic pixel unit R1, G1, or B1 displaying the color in middle gray scale, and one monochromatic pixel unit R1, G1, or B1 displaying the color in middle gray scale pre-charges another monochromatic pixel unit R1, G1, or B1 displaying the color in low gray scale, as shown in FIG. 2B when the ichimatsu pattern is displayed.

Taking FIG. 2B as an example for illustration, during the ichimatsu pattern displayed, when the second data line 114d counted from the left charges the top-left monochromatic pixel unit R1, the monochromatic pixel unit G1 located in the neighboring column (the second column counted from the left) and in the next row may be pre-charged. The monochromatic pixel unit R1 being charged displays the color in low gray scale, while the monochromatic pixel unit G1 being pre-charged displays the color in middle gray scale.

Similarly, when the second data line 114d counted from the left outputs a pixel voltage to charge the monochromatic pixel unit G1 in the second row counted from the top, the monochromatic pixel unit B1 located in the leftmost column and in the next row (the third row counted from the top) may be pre-charged. The monochromatic pixel unit G1 being charged displays the color in middle gray scale, while the monochromatic pixel unit B1 being pre-charged displays the color in low gray scale.

Accordingly, when the ichimatsu pattern is displayed, the monochromatic pixel unit R1, G1, or B1 displaying the color in low gray scale will pre-charge another monochromatic pixel unit R1, G1, or B1 displaying the color in middle gray scale, and the monochromatic pixel unit R1, G1, or B1 displaying the color in middle gray scale will pre-charge another monochromatic pixel unit R1, G1, or B1 displaying the color in low gray scale.

Therefore, the voltages received by the monochromatic pixel units R1, G1, and B1 being charged or pre-charged are substantially the same, so that the monochromatic pixel units R1, G1, and B1 displaying the color in middle gray scale are under the same gray scale brightness, and the monochromatic pixel units R1, G1, and B1 displaying the color in low gray scale are also under the same gray scale brightness. Thus, the probability of color distortion in the ichimatsu pattern is decreased, and the color of the ichimatsu pattern is prompt closer to white or substantially white. Thus, it is not easy for the color of the ichimatsu pattern to be close to a color such as red, green, or blue except white.

In view of the above, the triple-gate LCD panel provided in the present invention includes the transistor array substrate, the color filter array substrate, and the liquid crystal layer, and a plurality of pixel switches of the transistor array substrate, the liquid crystal layer, and the color filter array substrate define a plurality of red pixel units, a plurality of green pixel units, and a plurality of blue pixel units, so that the triple-gate LCD panel in the present invention can be applied to an LCD and fabricated into an LCD screen of an LCD TV set or a computer, or fabricated into a screen of an electronic device, such as a mobile phone, a personal digital assistant (PDA), or a laptop.

The invention being thus described, it is not intended to limit the present invention. Any equivalent replacement of modification or improvement made by one skilled in the art without departing from the spirit and scope of the present invention is also intended to be included within the scope of the following claims.

What is claimed is:

1. A triple-gate LCD panel, comprising:
   a transistor array substrate, comprising a substrate and a transistor array disposed on the substrate, wherein the transistor array comprises a plurality of scan lines, a plurality of data lines, and a plurality of pixel switches, the pixel switches are arranged along the scan lines and the data lines in an array, and are connected to the scan lines and the data lines, the pixel switches in any column are connected to two adjacent data lines respectively, and two adjacent pixel switches in any column are connected to the same data line;
   a color filter array substrate; and
   a liquid crystal layer, disposed between the transistor array substrate and the color filter array substrate, wherein the pixel switches, the liquid crystal layer, and the color filter array substrate define a plurality of monochromatic pixel units, the monochromatic pixel units in any row comprise a plurality of red pixel units, a plurality of green pixel units, or a plurality of blue pixel units; the red pixel units, the green pixel units, and the blue pixel units in any column are arranged periodically.

2. The triple-gate LCD panel according to claim 1, wherein in any column, three adjacent pixel switches are connected to the same data line, and another three adjacent pixel switches are connected to another data line.

3. The triple-gate LCD panel according to claim 1, wherein the red pixel units in any column are not adjacent to each other, the green pixel units in any column are not adjacent to each other, and the blue pixel units in any column are not adjacent to each other; in any column of the monochromatic pixel units, one of the red pixel units, one of the green pixel units, and one of the blue pixel units are adjacent to each other and form a main pixel unit.

4. The triple-gate LCD panel according to claim 3, wherein in any one of the main pixel units, the monochromatic pixel units are arranged along the data line, and an arrangement order of the monochromatic pixel units is the red pixel unit, the green pixel unit, and the blue pixel unit.

5. The triple-gate LCD panel according to claim 3, wherein the monochromatic pixel units in the same main pixel unit are electrically connected to the same data line.

6. The triple-gate LCD panel according to claim 5, wherein among the main pixel units in the same column, some main pixel units are electrically connected to one data line, and the other main pixel units are electrically connected to another data line.

7. The triple-gate LCD panel according to claim 6, wherein in any two adjacent main pixel units in the same column, one main pixel unit is electrically connected to one data line, and the other main pixel unit is electrically connected to another data line.

8. The triple-gate LCD panel according to claim 3, wherein in the same main pixel unit, two monochromatic pixel units are electrically connected to one data line, and the other monochromatic pixel unit is electrically connected to another data line.

9. The triple-gate LCD panel according to claim 8, wherein in the same main pixel unit, the monochromatic pixel units electrically connected to the same data line are not adjacent to each other.

10. The triple-gate LCD panel according to claim 9, wherein among the monochromatic pixel units in the same column, the red pixel units and the blue pixel units are electrically connected to the same data line, and the green pixel units are electrically connected to another data line.

* * * * *